United States Patent
Cromer et al.

(10) Patent No.: US 6,334,147 B1
(45) Date of Patent: Dec. 25, 2001

(54) DATA PROCESSING SYSTEM AND METHOD FOR REMOTELY ACCESSING A CLIENT COMPUTER SYSTEMS'S INDIVIDUAL INITIALIZATION SETTINGS WHILE THE CLIENT IS POWERED OFF

(75) Inventors: Daryl Carvis Cromer, Cary; Brandon Jon Ellison, Raleigh; Eric Richard Kern, Durham; Randall Scott Springfield, Chapel Hill; Howard J. Locker, Cary, all of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/201,572

(22) Filed: Nov. 30, 1998

(51) Int. Cl.[7] ..................................................... G06F 15/16
(52) U.S. Cl. .......................... 709/217; 709/221; 709/222; 709/203; 709/202; 713/2
(58) Field of Search .................................... 709/222, 221, 709/202, 203, 217; 713/1, 2

(56) References Cited

U.S. PATENT DOCUMENTS

| | | | |
|---|---|---|---|
| 5,504,905 | * | 4/1996 | Cleary et al. ........................ 713/100 |
| 5,675,800 | * | 10/1997 | Fisher, Jr. et al. ........................ 713/2 |
| 5,680,547 | * | 10/1997 | Chang .................................. 709/222 |
| 5,978,911 | * | 11/1999 | Knox et al. ............................... 713/1 |
| 5,978,912 | * | 11/1999 | Rakavy et al. ........................ 709/222 |
| 6,029,196 | * | 2/2000 | Lenz ...................................... 709/221 |
| 6,158,020 | * | 12/2000 | Locker et al. ............................ 714/7 |
| 6,160,873 | * | 12/2000 | Truong et al. .................. 379/102.02 |

* cited by examiner

Primary Examiner—Dung C. Dinh
Assistant Examiner—Chuong Ho
(74) Attorney, Agent, or Firm—J. Bruce Schelkopf; Bracewell & Patterson, LLP

(57) ABSTRACT

A data processing system and method are described for remotely accessing a client computer system's individual initialization settings. The client computer system is coupled to a server computer system to form a local area network. The server computer system transmits a command to the client computer system to access a selected one of the client computer system's initialization settings. In response to a receipt of this command by the client computer system, the client computer system accesses only selected ones of the initialization settings. The client computer system may be powered off while the initialization setting is accessed.

25 Claims, 6 Drawing Sheets

DATA PROCESSING SYSTEM AND METHOD FOR REMOTELY ACCESSING A CLIENT COMPUTER SYSTEMS'S INDIVIDUAL INITIALIZATION SETTINGS WHILE THE CLIENT IS POWERED OFF

CROSS-REFERENCE OF RELATED APPLICATIONS

The present invention is related to the subject matter of U.S. Pat. No. 6,275,851 entitled "DATA PROCESSING SYSTEM AND METHOD FOR REMOTELY CONTROLLING MODIFICATIONS OF A CLIENT'S INITIALIZATION SETTINGS" issued on Aug. 14, 2001, and U.S. Pat. No. 6,266,696 entitled "FULL TIME NETWORK AUXILIARY PROCESSOR FOR A NETWORK CONNECTED PC" issued on Jul. 24, 2001 both assigned to the assignee herein named and incorporated herein by reference.

BACKGROUND OF THE INVENTION

1. Field of the Invention

The present invention relates in general to data processing systems and, in particular, to a data processing system and method including a server and client computer system coupled together utilizing a local area network. Still more particularly, the present invention relates to a data processing system and method including a server and client computer system coupled together utilizing a local area network for remotely accessing only one of a plurality of initialization settings included within the client computer system while the client is powered off.

2. Description of the Related Art

Personal computer systems are well known in the art. They have attained widespread use for providing computer power to many segments of today's modern society. Personal computers (PCs) may be defined as a desktop, floor standing, or portable microcomputer that includes a system unit having a central processing unit (CPU) and associated volatile and non-volatile memory, including random access memory (RAM) and basic input/output system read only memory (BIOS ROM), a system monitor, a keyboard, one or more flexible diskette drives, a CD-ROM drive, a fixed disk storage drive (also known as a "hard drive"), a pointing device such as a mouse, and an optional network interface adapter. One of the distinguishing characteristics of these systems is the use of a motherboard or system planar to electrically connect these components together. Examples of such personal computer systems are IBM's PC series, Aptiva series, and Thinkpad series.

With PCs being increasingly connected into networks to allow transfers of data among computers to occur, more operations such as maintenance, updating of applications, and data collections are occurring over the network. Computer networks are also becoming essential to their user. It is desirable minimize loss of productivity by increasing availability of network resources. In today's network world, the availability and performance of the network is as important as the availability and performance of the personal computer.

A computer system requires a basic input/output system (BIOS) in order to operate. The BIOS is code that controls basic hardware operations, such as interactions with disk drives, hard drives, and the keyboard.

When a computer is reset, POST begins executing. POST uses the initialization settings to configure the computer. BIOS then controls the basic operation of the hardware utilizing the hardware as it was configured by POST.

The data stored in CMOS, and utilized by POST, may be modified only when the system has been powered up. One of the modified settings may cause the client computer system to malfunction. Once the client computer system has malfunctioned due to the modified setting, the administrator of the local area network is unable to return the client to its original working settings. In the prior art, the client computer system must be fully functional prior to a modification being permitted to the initialization settings remotely. If the client was not fully functional, the initialization settings could not be modified remotely.

Therefore a need exists for a data processing system and method for remotely accessing individual initialization settings included within a client computer system.

SUMMARY OF THE INVENTION

A data processing system and method are described for remotely accessing a client computer system's individual initialization settings. The client computer system is coupled to a server computer system to form a local area network. The server computer system transmits a command to the client computer system to access one of the client computer system's initialization settings. In response to a receipt of this command by the client computer system, the client computer system accesses only the one of the initialization settings. The client computer system may be powered off while the initialization setting is accessed.

The above as well as additional objectives, features, and advantages of the present invention will become apparent in the following detailed written description.

BRIEF DESCRIPTION OF THE DRAWINGS

The novel features are set forth in the appended claims. The present invention itself, however, as well as a preferred mode of use, further objectives, and advantages thereof, will best be understood by reference to the following detailed description of a preferred embodiment when read in conjunction with the accompanying drawings, wherein:

DETAILED DESCRIPTION OF A PREFERRED EMBODIMENT

Figure 1:
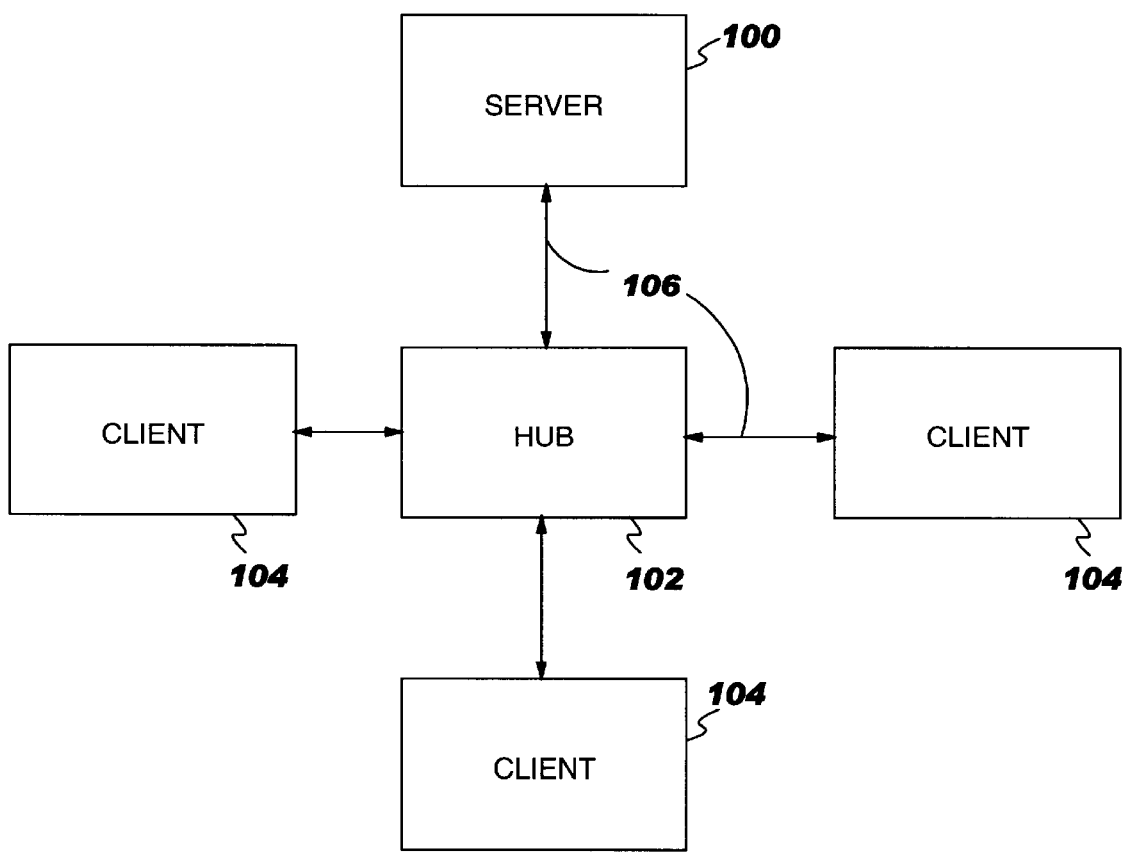
FIG. 1 illustrates a pictorial representation of a data processing system including a plurality of client computer systems coupled to a server computer system utilizing a network and a hub in accordance with the method and system of the present invention.

A preferred embodiment of the present invention and its advantages are better understood by referring to FIGS. 1–6 of the drawings, like numerals being used for like and corresponding parts of the accompanying drawings.

The present invention is a method and system for remotely accessing only one of a plurality of initialization settings included within a client computer system. A server computer system is coupled to the client to form a local area network (LAN). The server transmits a command to the client to access a particular one of the client's initialization settings. In response to a receipt of the command, the client accesses only the particular initialization setting. The other initialization settings are not accessed. The individual initialization settings may be accessed while the client computer system is powered down.

The command the server transmits is a command to either read from or write to the particular initialization setting. The command includes an offset which identifies the particular initialization setting to be accessed. If the command is a "READ" command, the value stored in the storage location which is identified by the offset is read. The value that is read is then transmitted back to the server computer system. If the command is a "WRITE" command, the command will include an offset as well as data to be written. The value stored in the storage location identified by the offset is then modified by writing the new data into the location.

A service, or special purpose, processor is included within the client computer system to process the read and write commands. An offset register and a data register are also established within the client computer system. When a server transmits a read command, the command will also include an offset which identifies the particular storage location to be read. When the command is received, the offset is stored within the offset register. The service processor accesses the storage location identified by the offset stored in the offset register and reads the value stored at that location. The value which was read is then stored in the data register. The client then transmits the value stored in the data register back to the server.

When the command is a WRITE command, the command will include the offset as well as the data to be written. When the command is received, the offset is stored in the offset register and the data to be written is stored in the data register. The service processor accesses the storage location identified by the offset stored in the offset register and writes the value stored in the data register to that location.

If the initialization settings have been modified causing the client to malfunction, the client will not be able to complete its boot sequence. In the prior art, the administrator of the LAN could not remotely return the client to a working condition. Utilizing the present invention, the administrator may remotely modify one or more initialization settings while the client computer system is powered off.

FIG. 1 illustrates a pictorial representation of a data processing system including a plurality of client computer systems 104 coupled to a server computer system 100 utilizing a hub 102 in accordance with the method and system of the present invention. Server computer system 100 is connected to a hub 102 utilizing a local area network (LAN) connector bus 106. Respective client systems 104 also connect to hub 102 through respective LAN busses 106. The preferred form of the network conforms to the Ethernet specification and uses such hubs. It will be appreciated, however, that other forms of networks, such as token ring, may be utilized to implement the invention.

A "network" may include any type of data communications channel, such as an Ethernet network, token ring, or X.10 or X.25. Those skilled in the art will recognize that the invention described herein may be implemented utilizing any type of data communications channel. However, the preferred embodiment is implemented utilizing an Ethernet network.

Figure 2:
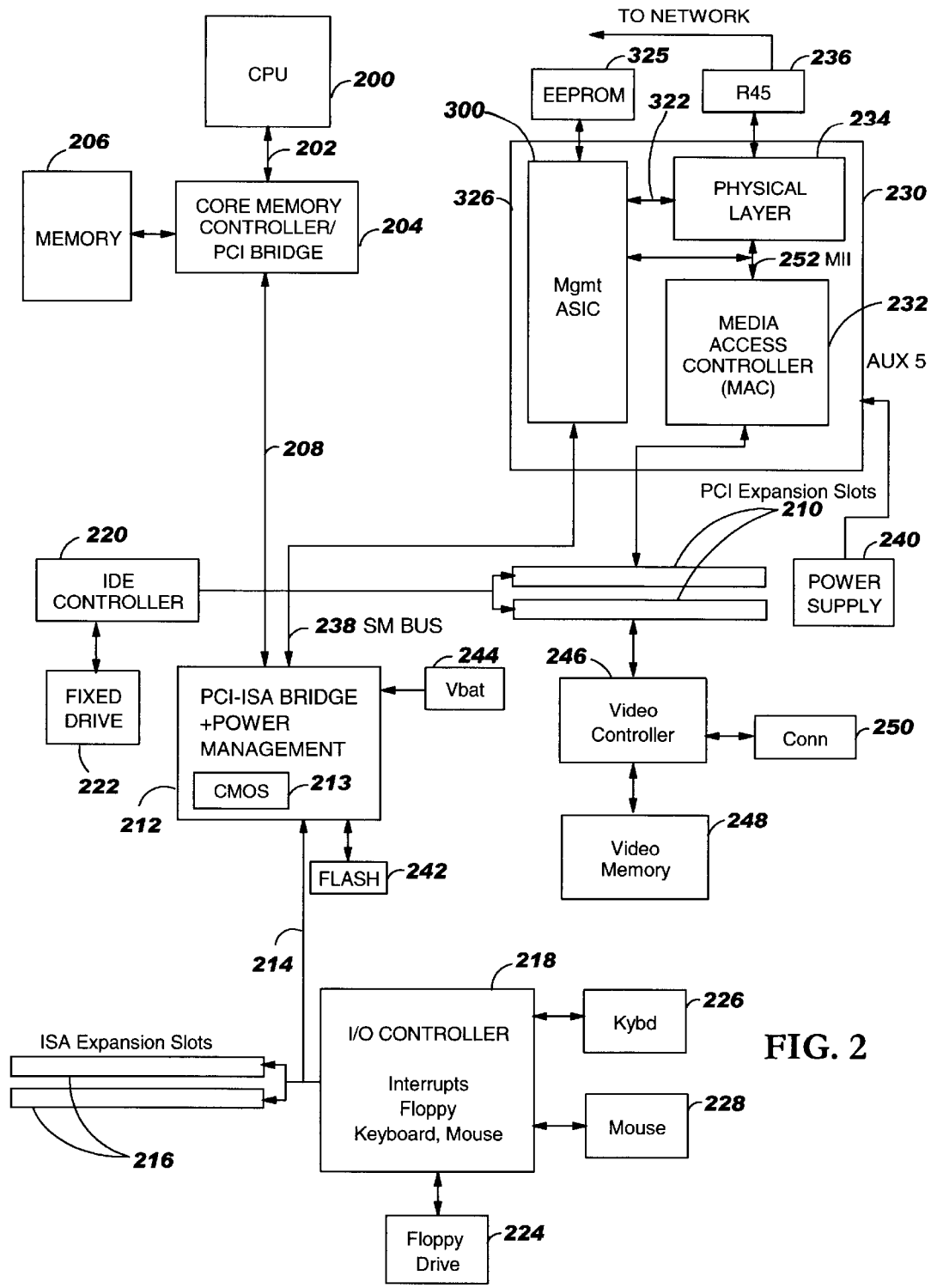
FIG. 2 depicts a pictorial representation of a network adapter included within a client computer system in accordance with the method and system of the present invention.

FIG. 2 illustrates a pictorial representation of a network adapter 230 included within a client computer system in accordance with the method and system of the present invention. A central processing unit (CPU) 200 is connected by address, control, and data busses 202 to a memory controller and peripheral component interconnect (PCI) bus bridge 204 which is coupled to system memory 206. An integrated drive electronics (IDE) device controller 220, and a PCI bus to Industry Standard Architecture (ISA) bus bridge 212 are connected to PCI bus bridge 204 utilizing PCI bus 208. IDE controller 220 provides for the attachment of IDE compatible storage devices such as fixed disk drive 222. PCI/ISA bridge 212 provides an interface between PCI bus 208 and an optional feature or expansion bus such as the ISA bus 214. PCI/ISA bridge 212 includes power management logic. A PCI standard expansion bus with connector slots 210 is coupled to PCI bridge 204. PCI connector slots 210 may receive PCI bus compatible peripheral cards. An ISA standard expansion bus with connector slots 216 is connected to PCI/ISA bridge 212. ISA connector slots 216 may receive ISA compatible adapter cards (not shown). It will be appreciated that other expansion bus types may be used to permit expansion of the system with added devices. It should also be appreciated that two expansion busses are not required to implement the present invention.

An I/O controller 218 is coupled to PCI-ISA bridge controller 212. I/O controller 218 controls communication between PCI-ISA bridge controller 212 and devices and peripherals such as floppy drive 224, keyboard 226, and mouse 228 so that these devices may communicate with CPU 200.

PCI-ISA bridge controller 212 includes an interface for a flash memory 242 which includes microcode which client 104 executes upon power-on. Flash memory 242 is an electrically erasable programmable read only memory (EEPROM) module and includes BIOS that is used to interface between the I/O devices and operating system. PCI-ISA bridge controller 214 also includes storage 213, which is preferably implemented utilizing CMOS storage, that holds the initialization settings. Storage 213 includes values which describe the present configuration of client 104. For example, storage 213 includes information describing the list of initial program load (IPL) devices set by a user and the sequence to be used for a particular power method, the type of display, the amount of memory, time date, etc. Furthermore, this data is stored in storage 213 whenever a special configuration program, such as configuration/setup is executed. PCI-ISA bridge controller 204 is supplied power from battery 244 to prevent loss of configuration data in storage 213.

Client system 104 includes a video controller 246 which may, for example, be plugged into one of connector slots 210. Video controller 246 is connected to video memory 248. The image in video memory 248 is read by controller 246 and displayed on a monitor (not shown) which is connected to client 104 through connector 250.

A client system 104 includes a network adapter 230 which may, for example, be plugged into one of the PCI connector slots 210 (as illustrated) or one of the ISA connector slots 216 in order to permit client 104 to communicate with a LAN via connector 236 to hub 102.

Client computer system 104 includes a special power supply 240 which supplies full normal system power, and has an auxiliary power main AUX 5 which supplies full time power to the power management logic 212 and to the network adapter 230. This enables client 104 to respond to a wakeup signal from network adapter 230. In response to a receipt of the wakeup signal, power supply 240 is turned on and then powers up client 104.

Network adapter 230 includes a physical layer 234 and a media access controller (MAC) 232 connected together utilizing a Media Independent Interface (MII) bus 252. The MII bus 252 is a specification of signals and protocols which define the interfacing of a 10/100 Mbps Ethernet Media Access Controller (MAC) 232 to the underlying physical layer 234.

MAC 232 processes digital network signals, and serves as an interface between a shared data path, i.e. the MII bus 252, and the PCI bus 208. MAC 232 performs a number of functions in the transmission and reception of data packets. For example, during the transmission of data, MAC 232 assembles the data to be transmitted into a packet with address and error detection fields. Conversely, during the reception of a packet, MAC 232 disassembles the packet and performs address checking and error detection. In addition, MAC 232 typically performs encoding/decoding of digital signals transmitted over the shared path and performs preamble generation/removal, as well as bit transmission/reception. In a preferred embodiment, MAC 232 is an Intel 82557 chip. However, those skilled in the art will recognize that the functional blocks depicted in network adapter 230 may be manufactured utilizing a single piece of silicon.

Physical layer 234 conditions analog signals to go out to the network via an R45 connector 236. Physical layer 234 may be a fully integrated device supporting 10 and 100 Mb/s CSMA/CD Ethernet applications. Physical layer 234 receives parallel data from the MII local bus 252 and converts it to serial data for transmission through connector 236 and over the network. Physical layer 234 is also responsible for wave shaping and provides analog voltages to the network. In a preferred embodiment, physical layer 234 is implemented utilizing an Integrated Services chip ICS-1890.

Physical layer 234 includes auto-negotiation logic that serves three primary purposes. First, it determines the capabilities of client computer 104. Second, it advertises its own capabilities to server computer 100. Third, it establishes a connection with server computer 100 using the highest performance connection technology.

Network adapter 230 includes a service processor, or logic module, 300 coupled to the MII bus 252 between physical layer 234 and MAC 232. Service processor 300 may be a "hard wired" application specific integrated circuit (ASIC) or a programmed general-purpose processor which is programmed as more fully described below. By coupling ASIC 300 to the MII bus 252, ASIC 300 may send and receive network packets using physical layer 234.

Data from client computer system 104 is accessed by ASIC 300 over a system management bus (SM) 238. System management bus 238 is a two-wire, low-speed serial bus used to interconnect management and monitoring devices. With the trickle power supplied by signal AUX 5 from power supply 240, ASIC 300 is preferably powered full time. Micro-controller 302 (shown in FIG. 3) included within ASIC 300 is coupled to bridge controller 212 via the System Management (SM) bus 238 through SM bus interface 316. This provides a path to allow software running on client 104 to access ASIC and EEPROM 320.

Figure 3:
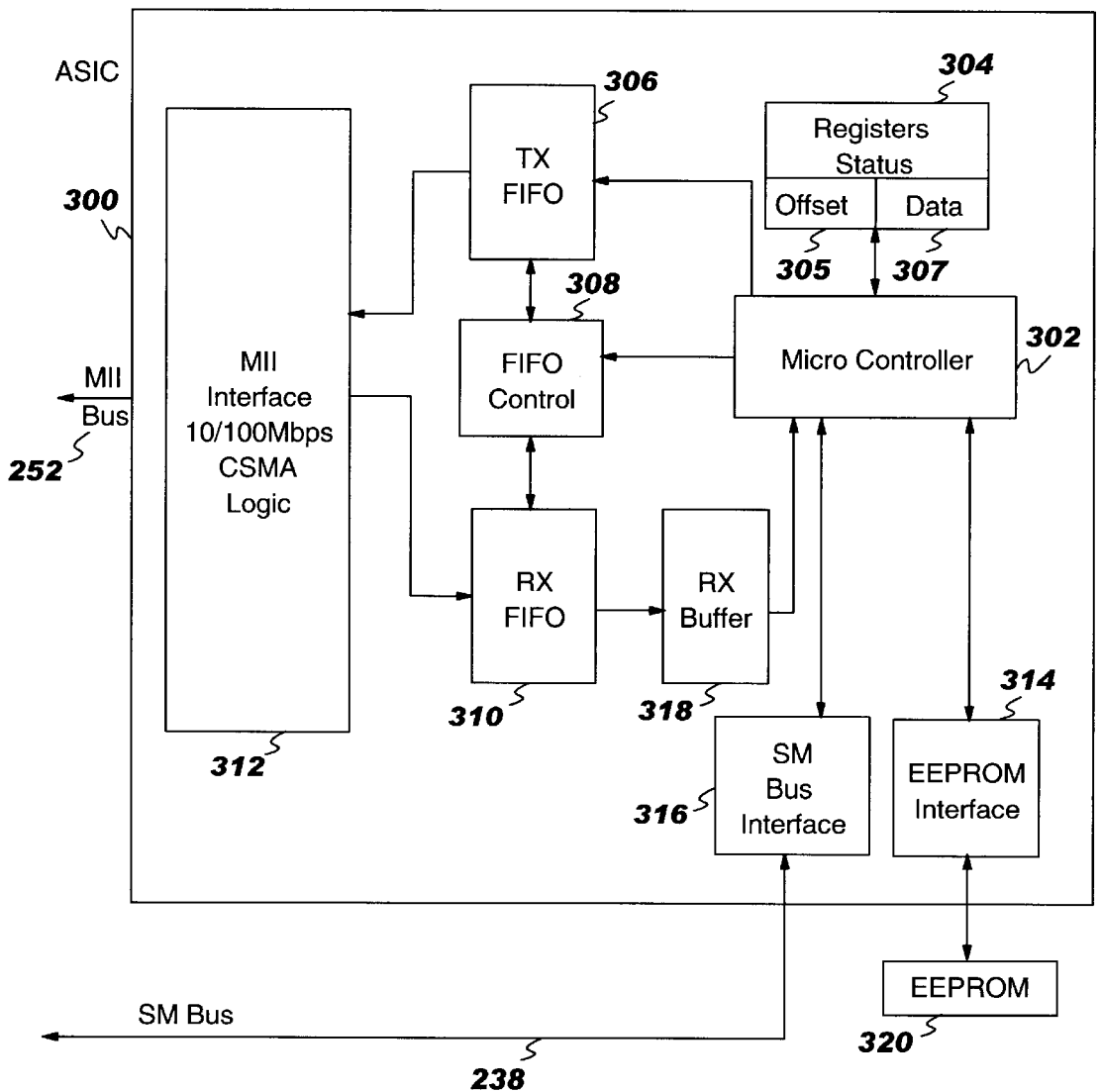
FIG. 3 illustrates a pictorial representation of a management ASIC which is included within a network adapter included within a client computer system in accordance with the method and system of the present invention.

FIG. 3 illustrates a pictorial representation of management ASIC 300 which is included within a network adapter 230 included within a client computer system 104 in accordance with the method and system of the present invention. ASIC 300 includes a micro-controller 302 which includes several state machines to handle the following tasks: packet reception, SM bus interface, and EEPROM updates. Micro-controller 302 sends commands to FIFO control 308 to control data flow from TX FIFO 306, RX FIFO 310, and RX Buffer 318. Micro-controller 302 also responds to SM bus requests from software running on client 104 to access register status 304 or access EEPROM 320. Signals are received from the MII bus 252 by interface unit 312 and passed to RX FIFO 310.

Micro-controller 302 accesses EEPROM 320 through EEPROM interface 314 to obtain values to create network packets such as source and destination MAC addresses, IP protocol information, authentication headers, and Universal Data Packet headers. Further, EEPROM 320 retains the Universal Unique Identifier (UUID).

Registers 304 of ASIC 300 also includes an offset register 305 and a data register 307. The offset included within a command received from a server is stored in register 305. When the command is a read command, the data which was read is stored in register 307. When the command is a write command, the data which is to be written is stored in register 307.

Because ASIC 300 can send information and data to CMOS 213 included within bridge 212 utilizing SM bus 238, client 104A need not be powered up in order to access CMOS 213. Therefore, ASIC 300 may receive and process network packets which include commands to access initialization setting while client 104A is powered off, or when client 104A is inoperable due to an improperly modified initialization setting.

Figure 4:
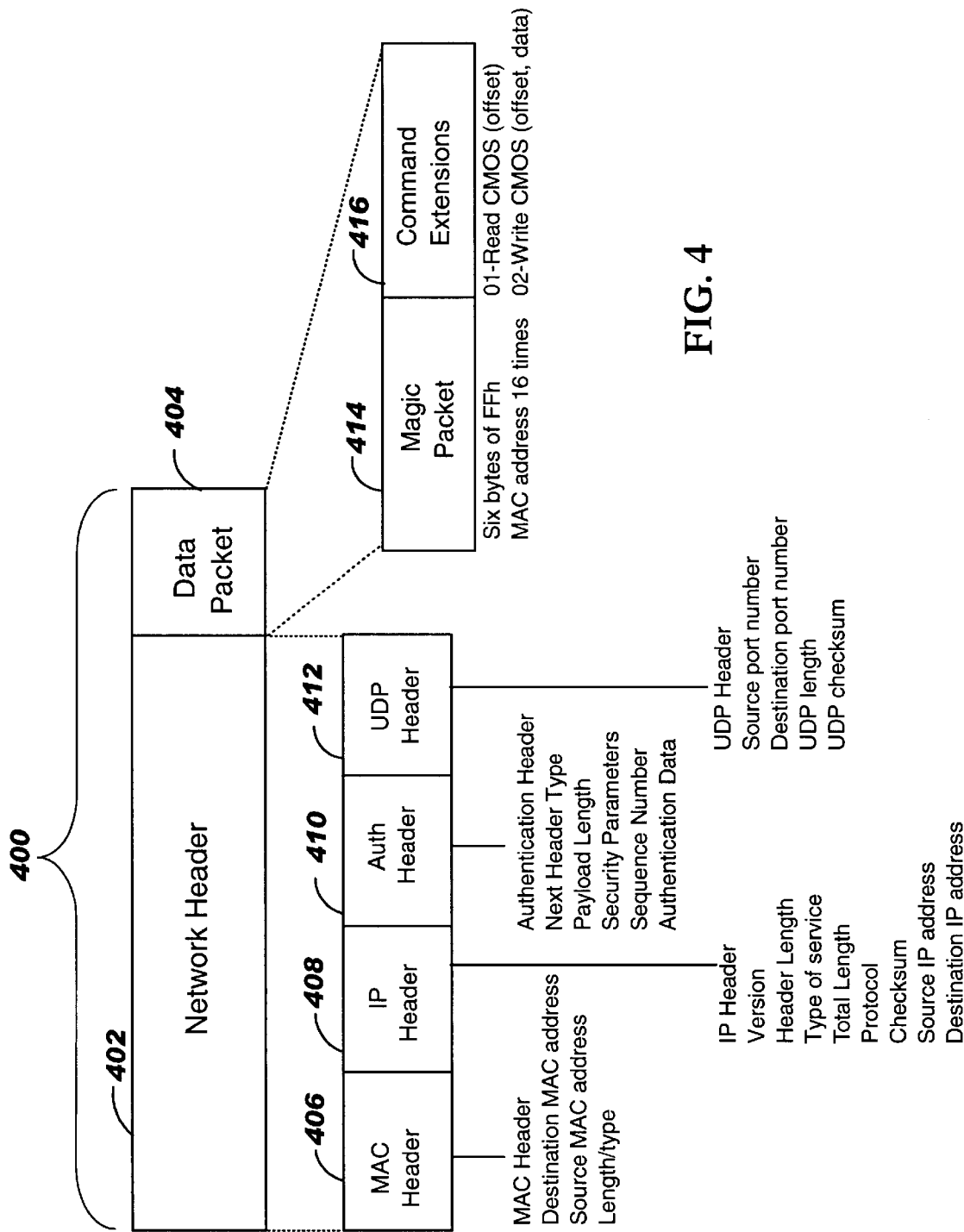
FIG. 4 illustrates a pictorial representation of a network packet, including a network header and a data packet, which may be transmitted by a server computer system over the network in accordance with the method and system of the present invention.

FIG. 4 illustrates a pictorial representation of a network packet 400, including a network header 402 and a data packet 404, which may be transmitted by a server computer system over the network in accordance with the method and system of the present invention. Each network packet 400 includes a network header 402 and a data packet 404.

Network header 402 includes a MAC header 406, IP header 408, authentication header 410, and UDP header 412 which are all known in the art to provide addresses, identifiers, and other information for assuring correct transfer of the packet. Data packet 404 includes the information content to be transferred.

Data packet 404 includes a magic packet 414 and command extensions 416. The content of Magic packet 414 is six bytes of "FF" followed by 12 copies of client MAC addresses. Magic packet 414 is a specialized type of packet. Magic packet 414 is a management packet which does not include standard network data. When magic packet 414 is detected utilizing the six bytes of "FF", MAC 232 will ignore magic packet 414.

Data packet 404 also may include command extensions 416. Server computer system 100 may specify one of a plurality of command extensions in data packet 404 in order to cause ASIC 300 to read or write an individual initialization setting.

When a network packet 400 is received by client 104, it is received by physical layer 234 and placed on the MII bus 252. When network packet 400 includes magic packet 414, MAC 232 detects that it includes magic packet 414, and then MAC 232 ignores any command extensions 416.

ASIC 300 also receives network packet 400 utilizing the MII interface 312. Data packet 404 is transferred to RX FIFO 310 and then to RX buffer 318. Micro-controller 302 then inspects data packet 404 and determines whether data packet 404 includes command extensions 416. If command extensions 416 are included, the appropriate function is executed in accordance with the description which follows.

Figure 5:
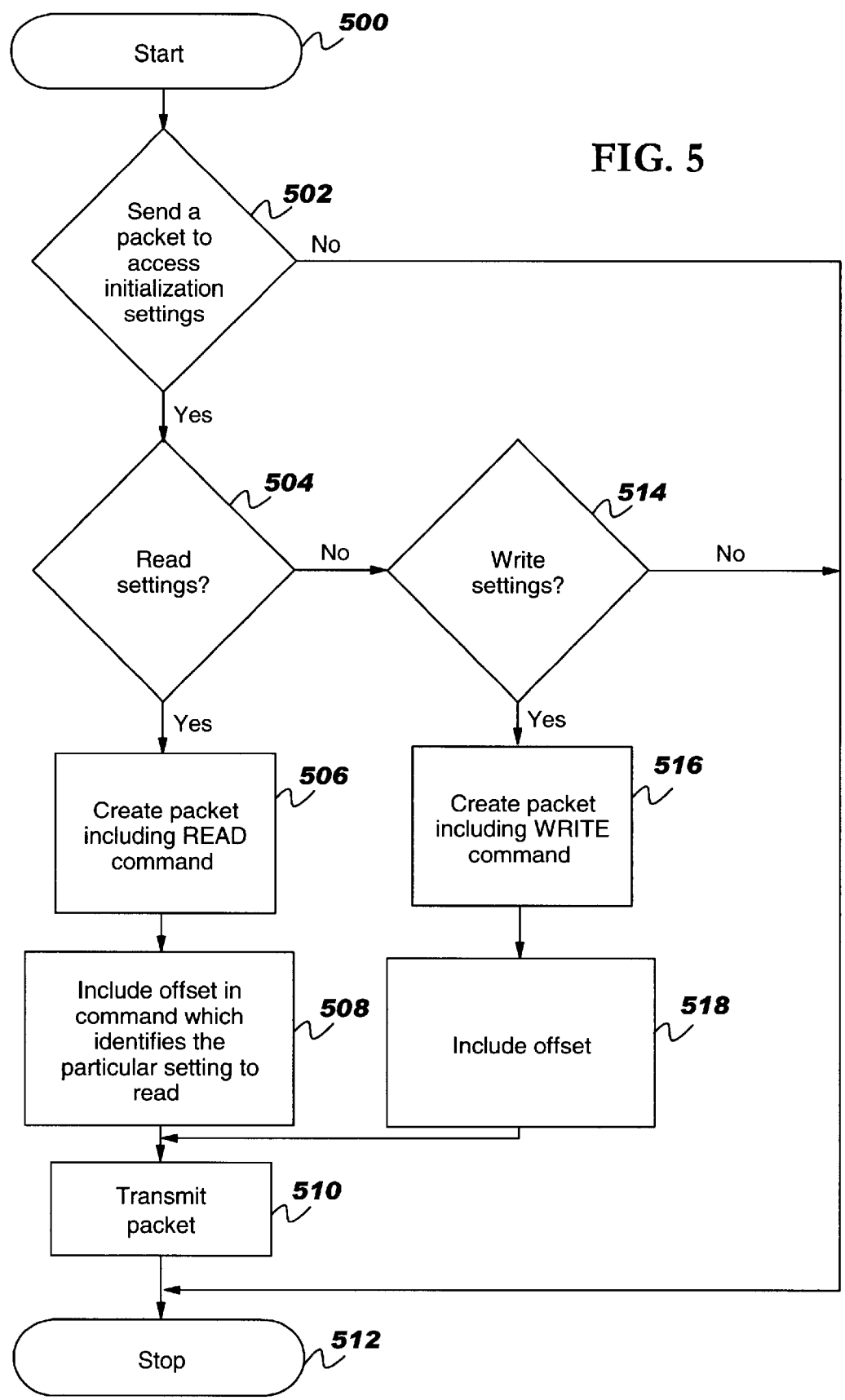
FIG. 5 depicts a high level flow chart which illustrates a server computer system transmitting a command to access one of a plurality of initialization settings included within a client computer system in accordance with the method and system of the present invention.

FIG. 5 depicts a high level flow chart which illustrates a server computer system transmitting a command to access one of a plurality of initialization settings included within a client computer system in accordance with the method and system of the present invention. The process starts as depicted by block 500 and thereafter passes to block 502 which illustrates a determination of whether or not the server will transmit a network packet to a client which includes a command to access initialization settings within the client. If a determination is made that the server will not transmit such packet, the process terminates as depicted by block 512.

Referring again to block 502, if a determination is made that the server will transmit a network packet including a command to access initialization settings within the client, the process passes to block 504 which illustrates a determination of whether or not the server will transmit a packet which includes a command to read one of the initialization settings. If a determination is made that the server will transmit a packet which reads an initialization setting within the client, the process passes to block 506 which depicts the server creating a packet which includes a read command. Next, block 508 illustrates including an offset in the read command. The offset identifies the particular setting which is to be read. The offset is a value which defines a location within the CMOS storage which includes the particular setting.

Thereafter, block 510 depicts the server transmitting the network packet. The process then terminates as illustrated by block 512.

Referring again to block 504, if a determination is made that the packet will not include a command to read an initialization setting, the process passes to block 514 which depicts a determination of whether or not the packet will include a command to write data to an initialization setting. If a determination is made that the command will not include a command to write data, the process terminates as illustrated by block 512.

Referring again to block 514, if a determination is made that the packet will include a command to write data to a particular initialization setting, the process passes to block 516 which depicts the creation of a packet which includes a write data command. Next, block 518 illustrates including an offset which identifies a particular setting. Block 518 also illustrates including the data which is to be written to this setting. This new data will be written into the location of CMOS storage which is identified by the offset. The process then passes to block 510.

Figure 6:
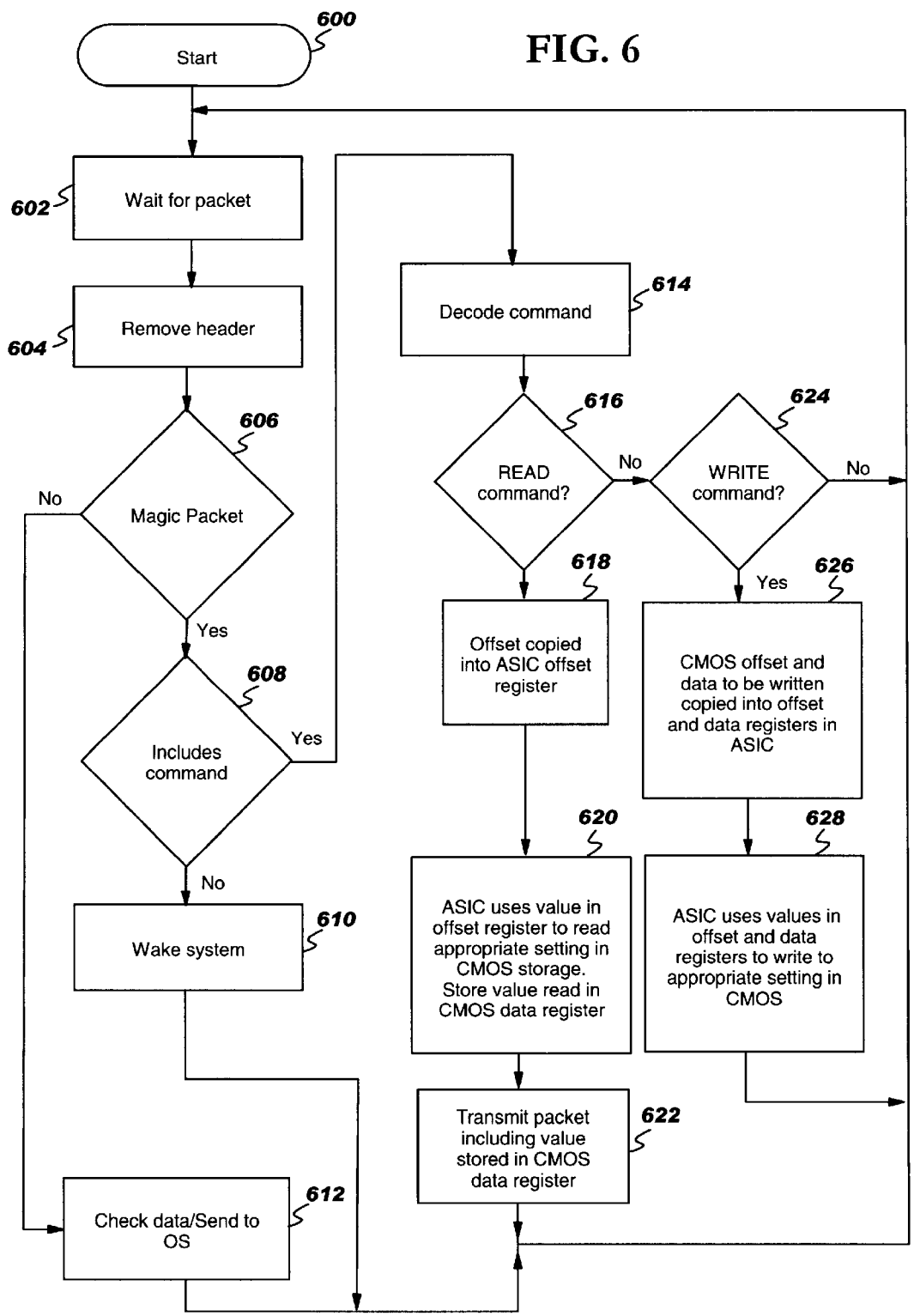
FIG. 6 illustrates a high level flow chart which depicts a client computer system processing a command to access one of a plurality of initialization settings included within the client computer system in accordance with the present invention.

FIG. 6 illustrates a high level flow chart which depicts a client computer system processing a command to access one of a plurality of initialization settings included within the client computer system in accordance with the present invention. The process starts as depicted by block 600 and thereafter passes to block 602 which illustrates a micro-controller 302 included within a client computer system waiting to receive network packet 400. When the packet has been received, physical layer 234 places data packet 404 included within network packet 400 on the MII bus 252. The MII bus 252 is read by MII interface 312 of ASIC 300. ASIC 300 transfers data packet 404 from MII interface 312 to RX FIFO 310 and to RX buffer 318.

The process then passes to block 604 which depicts micro-controller 302 removing network header 402 from the packet. Next, block 606 illustrates a determination by micro-controller 302 whether data packet 404 included magic packet 414. If a determination is made that data packet 404 did not include magic packet 414, the process passes to block 612 which depicts the data included within data packet 404 being sent to the operating system (OS). The process then passes back to block 602.

Referring again to block 606, if a determination is made that data packet 404 did include magic packet 414, the process passes to block 608 which illustrates a determination of whether or not data packet 404 also included additional commands 416. If a determination is made that data packet 404 does not include any additional commands 416, the process passes to block 610 which depicts the transmission of a wakeup command which will cause the client to power up. The process then passes back to block 602.

Referring again to block 608, if a determination is made that data packet 404 does include additional commands 416, the process passes to block 614 which depicts the decoding of the additional commands 416. Next, block 616 illustrates a determination of whether or not the command is a "READ data" command. If a determination is made that the command is a "READ data" command, the process passes to block 618 which depicts the offset included within the command being copied into register 305. The process then passes to block 620 which illustrates ASIC 300 using the value stored in register 305 to access CMOS 213. The value stored in register 305 is an index into CMOS 213 which identifies a particular storage location within CMOS 213. The value stored in the location identified by the offset is then stored in register 307. Next, block 622 depicts the server transmitting a network packet to the server which includes the value stored in register 307. In this manner, the particular location within CMOS 213 is read, and that data transmitted to the server. The process then passes back to block 602.

Referring again to block 616, if a determination is made that the command is not a "READ data" command, the process passes to block 624 which illustrates a determination of whether or not the command is a "WRITE data" command. If a determination is made that the command is not a "WRITE data" command, the process passes back to block 602. Referring again to block 624, if a determination is made that the command is a "WRITE data" command, the process passes to block 626 which depicts the offset included within the WRITE command being written into register 305, and the data included within the WRITE command being written into register 307. Next, block 628 illustrates ASIC 300 using the values stored in register 305 to access the location within CMOS 213 to be accessed and updated. The value stored in register 307 is written into that location within CMOS 213. The process then passes back to block 602.

While a preferred embodiment has been particularly shown and described, it will be understood by those skilled in the art that various changes in form and detail may be made therein without departing from the spirit and scope of the present invention.

What is claimed is:

1. A method in a data processing system for remotely accessing one of a plurality of initialization settings included within a client computer system which is powered off, said client computer system being coupled to a server computer system via a network adapter to form a local area network, said method comprising the steps of:
- said server computer system transmitting a command to said client computer system to access a selected one of said plurality of initialization settings; and
- in response to a receipt of said command by said network adapter, said network adapter accessing only said selected one of said plurality of initialization settings by reading from or writing to said one of said plurality of initialization settings, wherein others of said plurality of initialization settings are not accessed.

2. The method according to claim 1, wherein said client computer system includes a central processing unit, and further comprising the step of establishing a service processor within said network adapter separate from said central processing unit within said client computer system, and wherein said step of said network adapter accessing only said one of said plurality of initialization settings further comprises the step of said service processor accessing only said one of said plurality of initialization settings.

3. The method according to claim 2, wherein said step of said server computer system transmitting a command to said client computer system to access said initialization settings further comprises the step of said server computer system transmitting a command to said client computer system to read a value of said one of said plurality of initialization settings.

4. The method according to claim 3, further comprising the steps of:
- in response to a receipt of said command by said client computer system to read a value of said one of said plurality of initialization settings, said service processor reading a value of only said one of said plurality of initialization settings; and
- said network adapter transmitting said value of said one of said plurality of initialization settings to said server computer system.

5. The method according to claim 4, further comprising the steps of:
- said server computer system transmitting a command to said client computer system to modify one of said plurality of initialization settings; and
- in response to a receipt of said command by said client computer system, said service processor modifying only said one of said plurality of initialization settings, wherein others of said plurality of initialization settings are not accessed.

6. The method according to claim 5, wherein said step of said server computer system transmitting a command to said client computer system to modify said initialization settings further comprises the step of said server computer system transmitting a command to said client computer system to write a value to said one of said plurality of initialization settings.

7. The method according to claim 6, further comprising the step of in response to a receipt of said command by said client computer system to write a value to one of said plurality of initialization settings, said service processor writing said value to only said one of said plurality of initialization settings.

8. The method according to claim 7, further comprising the step of establishing an offset register and a data register in said client computer system which is accessible by said service processor.

9. The method according to claim 8, wherein the step of said server computer system transmitting a command to read a value of said one of said plurality of initialization settings further comprises the step of transmitting a command to read a value of said one of said plurality of initialization settings including an offset identifying said one of said plurality of initialization settings, and further comprising the step of storing said offset in said offset register.

10. The method according to claim 9, further comprising the step of in response to a receipt of said command by said client computer system to read a value of said one of said plurality of initialization settings, said service processor reading a value of only said one of said plurality of initialization settings utilizing said offset stored in said offset register.

11. The method according to claim 10, wherein said step of said server computer system transmitting a command to write a value to one of said plurality of initialization settings further comprises the step of transmitting a command to read one of said plurality of initialization settings including an offset identifying said one of said plurality of initialization settings and including said value to be written, and further comprising the step of storing said offset in said offset register and storing said value to be written in said data register.

12. The method according to claim 11, further comprising the step of in response to a receipt of said command by said client computer system to write a value to said one of said plurality of initialization settings, said service processor writing said value to only said one of said plurality of initialization settings utilizing said offset stored in said offset register and said value stored in said data register.

13. A data processing system for remotely accessing one of a plurality of initialization settings included within a client computer system which is powered off, said client computer system being coupled to a server computer system via a network adapter to form a local area network, comprising:
- said server computer system executing code for transmitting a command to said client computer system to access one of said plurality of initialization settings; and
- said network adapter executing code, in response to a receipt of said command by said network adapter, for accessing only said one of said plurality of initialization settings by reading from or writing to said one of said plurality of initialization settings, wherein others of said plurality of initialization settings are not accessed.

14. The system according to claim 13, wherein said client computer system includes a central processing unit, and further comprising a service processor included within said network adapter separate from said central processing unit within said client computer system, and wherein said network adapter executing code for accessing only said one of said plurality of initialization settings further comprises said service processor executing code for accessing only said one of said plurality of initialization settings.

15. The system according to claim 14, wherein said server computer system executing code for transmitting a command to said client computer system to access said initialization settings further comprises said server computer system executing code for transmitting a command to said client computer system to read a value of said one of said plurality of initialization settings.

16. The system according to claim 15, further comprising:
- said service processor executing code, in response to a receipt of said command by said network adapter to read a value of said one of said plurality of initialization settings, for reading a value of only said one of said plurality of initialization settings; and said network adapter executing code for transmitting said value of said one of said plurality of initialization settings to said server computer system.

17. The system according to claim 16, further comprising:

said server computer system executing code for transmitting a command to said client computer system to modify one of said plurality of initialization settings; and said service processor executing code, in response to a receipt of said command by said network adapter, for modifying only said one of said plurality of initialization settings, wherein others of said plurality of initialization settings are not accessed.

18. The system according to claim 17, wherein said server computer system executing code for transmitting a command to said client computer system to modify said initialization settings further comprises said server computer system executing code for transmitting a command to said client computer system to write a value to said one of said plurality of initialization settings.

19. The system according to claim 18, further comprising said service processor executing code, in response to a receipt of said command by said network adapter to write a value to one of said plurality of initialization settings, for writing said value to only said one of said plurality of initialization settings.

20. The system according to claim 19, further comprising an offset register and a data register included within said client computer system which is accessible by said service processor.

21. The system according to claim 20, wherein said server computer system executing code for transmitting a command to read a value of said one of said plurality of initialization settings further comprises said server computer system executing code for transmitting a command to read a value of said one of said plurality of initialization settings including an offset identifying said one of said plurality of initialization settings, and further comprising said service processor executing code for storing said offset in said offset register.

22. The system according to claim 21, further comprising said service processor executing code, in response to a receipt of said command by said network adapter to read a value of said one of said plurality of initialization settings, for reading a value of only said one of said plurality of initialization settings utilizing said offset stored in said offset register.

23. The system according to claim 22, wherein said server computer system executing code for transmitting a command to write a value to one of said plurality of initialization settings further comprises said server computer system executing code for transmitting a command to read one of said plurality of initialization settings including an offset identifying said one of said plurality of initialization settings and including said value to be written, and further comprising said service processor executing code for storing said offset in said offset register and storing said value to be written in said data register.

24. The system according to claim 23, further comprising said service processor executing code, in response to a receipt of said command by said network adapter to write a value to said one of said plurality of initialization settings, for writing said value to only said one of said plurality of initialization settings utilizing said offset stored in said offset register and said value stored in said data register.

25. A data processing system including a server computer system coupled to a client computer system utilizing a network, comprising:

a network adapter included within said client computer system, said network adapter including a network controller and a special purpose processing unit coupled to said network controller, said network controller capable of receiving and transmitting network packets utilizing said network to and from said server computer system;

said network controller capable of receiving a network packet from said server computer system, said network packet including a magic packet and a command to access one of a plurality of initialization settings stored within a storage included within said client computer system;

said client computer system being powered-off;

while said client computer system is powered-off, said special purpose processing unit capable of determining said network packet includes said magic packet; and in response to said special purpose processing unit determining said network packet includes said magic packet, while said client computer system is power-off, said special purpose processing unit capable of accessing said one of said plurality of initialization settings by reading from or writing to said one of said plurality of initialization settings.

* * * * *